(12) United States Patent
Ang et al.

(10) Patent No.: US 11,943,761 B2
(45) Date of Patent: Mar. 26, 2024

(54) SRS MANAGEMENT FOR ADAPTIVE TX/RX DIVERSITY

(71) Applicant: QUALCOMM Incorporated, San Diego, CA (US)

(72) Inventors: Peter Pui Lok Ang, San Diego, CA (US); Enoch Shiao-Kuang Lu, San Diego, CA (US); Alexei Yurievitch Gorokhov, San Diego, CA (US); Aamod Khandekar, San Diego, CA (US); Brian Clarke Banister, San Diego, CA (US); Raghu Narayan Challa, San Diego, CA (US); Kuo-Chun Lee, San Diego, CA (US); Arvind Vardarajan Santhanam, San Diego, CA (US); Jianming Zhu, Acton, MA (US); Arash Ebadi Shahrivar, San Diego, CA (US); Pranay Sudeep Rungta, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/481,174

(22) Filed: Sep. 21, 2021

(65) Prior Publication Data
US 2023/0086772 A1  Mar. 23, 2023

(51) Int. Cl.
*H04W 72/52* (2023.01)
*H04L 5/00* (2006.01)
*H04W 72/044* (2023.01)
*H04W 72/1263* (2023.01)

(52) U.S. Cl.
CPC ....... *H04W 72/1263* (2013.01); *H04L 5/0051* (2013.01); *H04W 72/044* (2013.01); *H04W 72/52* (2023.01)

(58) Field of Classification Search
None
See application file for complete search history.

(56) References Cited

U.S. PATENT DOCUMENTS

| | | | |
|---|---|---|---|
| 2011/0256893 A1* | 10/2011 | Athley | H04B 7/0693 455/500 |
| 2013/0051261 A1* | 2/2013 | Kazmi | H04W 52/0277 370/252 |
| 2015/0147983 A1* | 5/2015 | Kerfoot, Jr. | H04W 52/0277 320/136 |

(Continued)

FOREIGN PATENT DOCUMENTS

WO    WO-2021036931 A1 *  3/2021  .......... H04B 7/0404

*Primary Examiner* — Kodzovi Acolatse
(74) *Attorney, Agent, or Firm* — Procopio, Cory, Hargreaves & Savitch

(57) ABSTRACT

A user equipment (UE) may make a joint decision of adaptive receive diversity (ARD) and adaptive transmit diversity (ATD) configurations, including transmit (Tx) and receive (Rx) antennas selection and/or blanking based on downlink (DL) and uplink (UL) traffic conditions. The UE may disable at least one Tx chain for a transmission of a codebook-based sounding reference signal (SRS) (SRS-CB) based on one or more of at least one DL traffic condition or at least one UL traffic condition, and transmit, to a base station, upon disabling the at least one Tx chain, the SRS-CB via an antenna associated with at least one active Tx chain.

22 Claims, 11 Drawing Sheets

(56) References Cited

U.S. PATENT DOCUMENTS

| | | | |
|---|---|---|---|
| 2016/0164580 A1* | 6/2016 | El-Najjar | H04W 72/085 |
| | | | 375/267 |
| 2018/0183503 A1* | 6/2018 | Rahman | H04W 72/042 |
| 2020/0204323 A1* | 6/2020 | Kim | H04L 5/0051 |
| 2020/0396684 A1* | 12/2020 | Lin | H04W 52/0216 |
| 2021/0242913 A1* | 8/2021 | Manolakos | H04B 7/0413 |
| 2021/0336333 A1* | 10/2021 | Yang | H04W 52/028 |
| 2021/0344789 A1* | 11/2021 | Zhang | H04W 24/04 |
| 2022/0123790 A1* | 4/2022 | Frenger | H01Q 3/26 |
| 2022/0166594 A1* | 5/2022 | Zhang | H04L 5/0098 |
| 2022/0174592 A1* | 6/2022 | Zhang | H04W 52/0212 |
| 2022/0190838 A1* | 6/2022 | Horn | H04W 72/1268 |
| 2022/0231808 A1* | 7/2022 | Oh | H04W 72/0446 |
| 2022/0271815 A1* | 8/2022 | Zhang | H04B 7/0404 |
| 2023/0328664 A1* | 10/2023 | Tang | H04W 16/28 |
| | | | 370/318 |

\* cited by examiner

SRS MANAGEMENT FOR ADAPTIVE TX/RX DIVERSITY

TECHNICAL FIELD

The present disclosure relates generally to communication systems, and more particularly, to a method of wireless communication including a sounding reference signal (SRS) management for adaptive transmit (Tx) or receive (Rx) (Tx/Rx) diversity.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) that may make a joint decision of the adaptive receive diversity (ARD) and adaptive transmit diversity (ATD) configuration, including the Tx and Rx antennas selection and/or blanking based on DL and UL traffic conditions. The apparatus may disable at least one transmit (Tx) chain for a transmission of a codebook-based sounding reference signal (SRS) (SRS-CB) based on one or more of at least one downlink (DL) traffic condition or at least one uplink (UL) traffic condition. The apparatus may also transmit, to a base station, upon disabling the at least one Tx chain, the SRS-CB via an antenna associated with at least one active Tx chain. A base station may identify one or more of at least one DL traffic condition or at least one UL traffic condition, the at least one DL traffic condition or the at least one UL traffic condition being associated with a transmission of an SRS-CB, transmit, to a UE, an indication of one or more of the at least one DL traffic condition or the at least one UL traffic condition, and receive, from the UE, the SRS-CB associated with the at least one DL traffic condition or the at least one UL traffic condition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
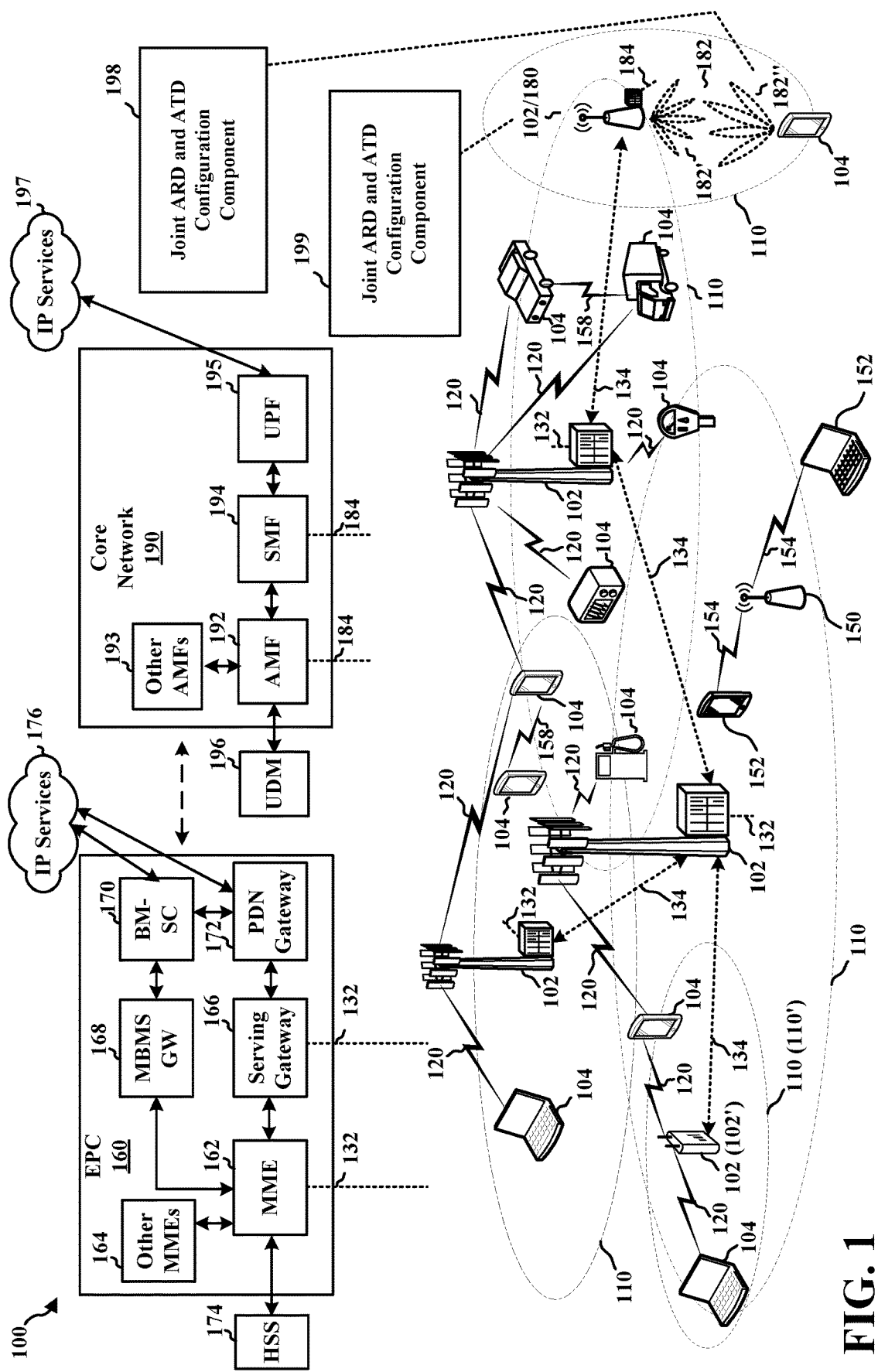
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR2-2, FR4, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a joint ARD and ATD configuration component 198 configured to disable at least one Tx chain for a transmission of a SRS-CB based on one or more of at least one DL traffic condition or at least one UL traffic condition, and transmit, to a base station, upon disabling the at least one Tx chain, the SRS-CB via an antenna associated with at least one active Tx chain. In one aspect, the base station 180 may include a joint ARD and ATD configuration component 199 configured to identify one or more of at least one DL traffic condition or at least one UL traffic condition, the at least one DL traffic condition or the at least one UL traffic condition being associated with a transmission of an SRS-CB, transmit, to a UE, an indication of one or more of the at least one DL traffic condition or the at least one UL traffic condition, and receive, from the UE, the SRS-CB associated with the at least one DL traffic condition or the at least one UL traffic condition. Although the following description may be focused on 5G NR, the concepts described herein may be applicable to other similar areas, such as LTE, LTE-A, CDMA, GSM, and other wireless technologies.

Figure 2:
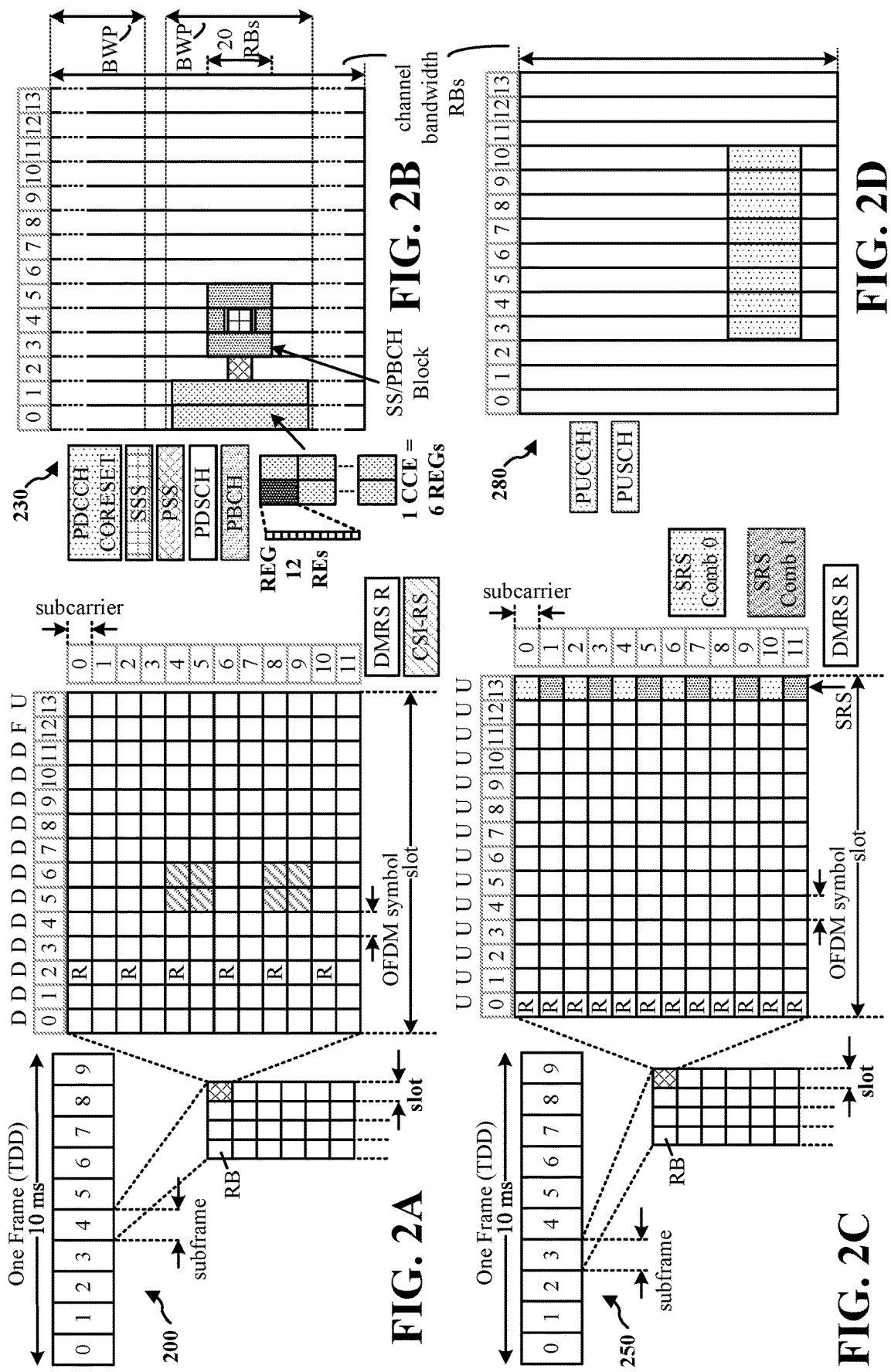
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRSs). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
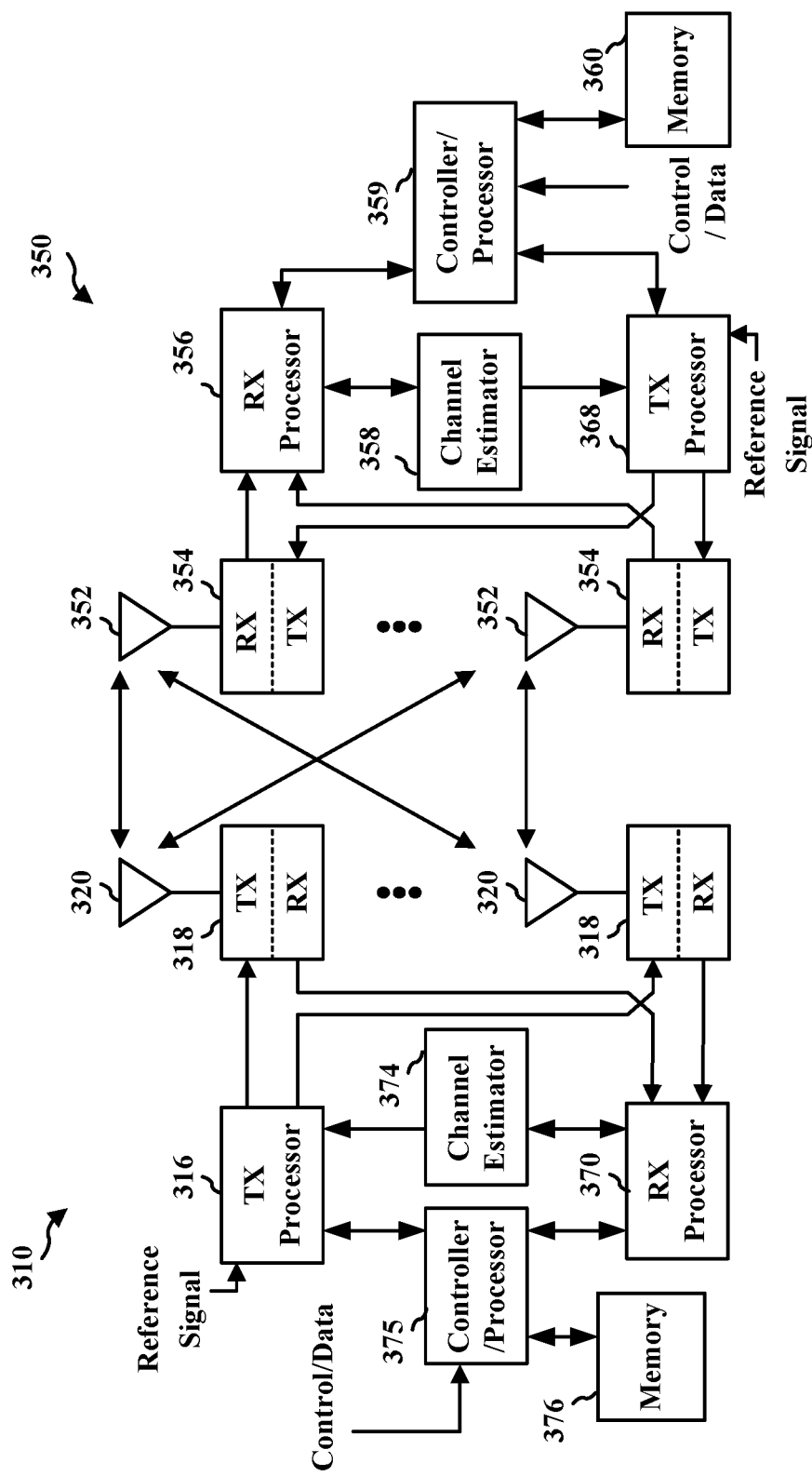
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

Here, the TX processor 316 may be a TX MIMO processor 316, and the TX MIMO processor may perform spatial processing (e.g., precoding) on data symbols, control symbols, and/or reference symbols, if applicable, and may provide output symbol streams to the transmitters 318TX. While described and labeled individually, in some embodiments, a single transmitter 318TX may modulate and demodulate MIMO transmissions for the base station 310.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

Here, the Rx processor 356 may include a MIMO detector/processor 356, and the MIMO detector/processor 356 may obtain received symbols from each receiver 354RX, perform MIMO detection on the received symbols if applicable and process (e.g., demodulate, deinterleave, and decode) the detected symbols, providing decoded data for the UE 350 to a data output, and provide decoded control information to the controller/processor 359, or memory 360.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects, a MIMO antenna configuration may be established between a UE and a base station. MIMO antenna processing may refer to a method for multiplying the capacity of a radio link through multiple transmissions and receiving antennas to provide multipath propagation. That is, through the MIMO antenna configuration, the UE and the base station may increase the UL or DL throughput via multiple UL or DL MIMO antennas. Based on the MIMO antenna configuration, the UE and the base station may be configured with an adaptive transmit diversity (ATD) or an adaptive receive diversity (ARD).

The UE or, in some examples, the base station may be configured with the ARD and reduce the number of active Rx chains to save power while minimizing or reducing negative effects to the DL performance to reduce power consumption. The UE or, in some examples, the base station may also be configured with the ATD to reduce or blank at least one of the UL antenna ports associated with a physical layer based on the communication conditions to reduce power consumption. That is, the UE configured with the ATD may switch from a first configuration with two or more layers, e.g., a spatial multiplexing dual layer (SMDL), to a second configuration with a single layer, e.g., a spatial multiplexing single layer (SMSL), to reduce the power consumption or enhance the system capacity. The UE may include at least one power amplifier (e.g., a second power amplifier associated with a second layer), and at least one digital chain (e.g., a second digital chain associated with the second layer) may be turned off to reduce the power consumption. In one aspect, the UE may be configured to drop at least one of the transmit signals to the base station without incurring a significant impact to the UL and the DL throughput. In another aspect, the UE may apply the ATD to the UL MIMO carriers.

In one aspect, the UE may perform the ATD and indicate user assistance information (UAI) to the base station with a reduced amount of UL MIMO layers. That is, the UE may determine to reduce the number of the UL MIMO layers based on at least one of a low power source, a low UL PDCP watermark, or a low UL throughput and may transmit the UAI indicating the reduced amount of UL MIMO layers to the base station. In another aspect, the base station may receive the UAI indicating the reduced amount of UL MIMO layers from the UE, and may determine to reduce the number of the UL MIMO layers based on the UAI received from the UE. However, the base station may not be obligated to act in accordance to the UE's preference indicated in the UAI, and since the ATD may be performed after the base station receives the UAI and determines to act, the ATD using the UAI may have increased latency.

In some aspects, the UE may be configured to autonomously determine ATD blanking, i.e., disabling at least one Tx or Rx port associated with transmission of at least one SRS. Here, the SRS may include an SRS for antenna switching (SRS-AS) or a codebook-based SRS (SRS-CB). The blanking or disabling of at least one Tx or Rx port may affect the UL throughputs or the DL throughputs, and the UE may implement interactions between the ARD and the ATD to mitigate the potential negative effect on the UL throughputs or the DL throughputs.

In one aspect, the configuration of the SRS may indicate that the SRS resource may be overloaded when the same SRS resource identified with one SRS resource identifier (ID) is configured to two SRS resource sets. For example, the same SRS resource identified with the same SRS resource ID may be configured to two SRS resource sets, including the SRS-AS for antenna switching purposes and the SRS-CB for codebook-based SRS usage, and the SRS-AS resources may be overloaded with the SRS-CB resources. In some examples, when the MIMO configuration includes Tx and Rx chains configured with two Tx chains and four Rx chains (2T4R), each of the two Tx chains may have one primary port and one diversity port. For example, the first Tx chain (Tx0) may have a first primary Tx port (PTx_0) associated with a first antenna (Ant_0) that is associated with a first Rx chain (Rx0) and a first diversity Tx port (DTx_0) associated with a third antenna (Ant_2) that is associated with a third Rx chain (Rx1), and the second Tx chain (Tx1) may have a second primary Tx port (PTx_1) associated with a fourth antenna (Ant_4) that is associated with a second Rx chain (Rx1) and a second diversity Tx port (DTx_1) associated with a second antenna (Ant_1) that is associated with a fourth Rx chain (Rx3), as indicated in Table 1 below.

TABLE 1

|       | UL-MIMO | Tx chain mapping | Rx chain mapping |
|-------|---------|------------------|------------------|
| Ant_0 | Tx0     | PTx_0            | Rx0              |
| Ant_1 |         | DTx_1            | Rx3              |
| Ant_2 |         | DTx_0            | Rx2              |
| Ant_3 | Tx1     | PTx_1            | Rx1              |

The SRS resource overloading may allow the network to configure two SRS resources. That is, the SRS resource overloading may refer to as sharing or reusing SRS resource set across the SRS-CB and the SRS-AS. For example, first SRS resources (SRS Res_0) may be used for codebook based UL-MIMO and antenna switching and may be transmitted using the primary Tx chains, including PTx_0 and PTx_1, and second SRS resources (SRS Res_1) may be used for the antenna switching and may be transmitted using the diversity Tx chains, including DTx_0 and DTx_1. Accordingly, the network may use the SRS resource overloading to reduce the SRS overhead. For example, a first resource set 0 may be configured for the codebook (CB) usage and may contain the SRS Res_0, and a second resource set 1 may be configured for the antenna switching (AS) usage and may contain the SRS Res_0 and SRS Res_1.

For non-overloading cases, the network may configure three SRS Resources, including first SRS resources (SRS Res_0) configured for the CB, second SRS resources (SRS Res_1) configured for the AS, and third SRS resources (SRS Res 2) configured for the AS. For the non-overloading cases, the network may configure the SRS resource sets as follows: the first resource set 0 may be configured for the CB usage and contain the SRS Res_0, and the second resource set 1 may be configured for the AS usage and may contain the SRS Res_1 and SRS Res 2.

The ATD may be turned off when the UE initially goes from one of idle or inactive RRC mode to a connected mode. In the connected mode, if the UL-MIMO is configured, the UE may periodically evaluate a number of conditions including, but not limited to, a power level of the power source, DL traffic, UL traffic, an SRS-AS configuration, and an SRS-CB configuration. The time interval or the frequency of such a periodic evaluation may be determined based on a function of how fast the base station may measure the SRS, measure the SRS and apply it to the scheduling, etc.

The UE may determine to blank, disable, or skip an SRS port to reduce the number of the SRS ports to reduce a power consumption and reserve wireless communication resources. The blanking may be a system-level operation that the UE may decide to perform, and, the base station may detect the blanking based on the reduced number of SRS ports transmitting the SRS and not receiving SRS via the blanked SRSs. Based on the nature of the SRS, the base station may detect that the base station may not expect to receive UL signals via the Tx chains of the UE associated with the blanked SRS-CB ports, and that the base station may not transmit DL signals according to the received SRS. In one aspect, the UE may disable at least one Tx chain for a transmission of the SRS. For instance, the UE may implement the blanking of the SRS port by disabling at least one Tx chain for a transmission of the SRS. In another aspect, the UE may identify at least one Tx chain to skip for the transmission of the SRS. For instance, the UE may implement the blanking of the SRS port by identifying at least one Tx chain to skip for the transmission of the SRS.

In one aspect, the ATD may drop a number of the SRS ports to one TX chain associated with the SRS port based on the UE having a low power source (e.g., a voltage level of the power source being less than a power threshold). That is, the UE may determine that the ATD blanking of the SRS port may be beneficial in light of the low power source.

In another aspect, the ATD may drop the number of the SRS port to one TX chain associated with the SRS port based on the UL traffic not being heavy and not being sensitive to latency when the SRS-AS is not configured or the SRS-AS resource is not overloaded with the SRS-CB resource. That is, when the SRS-AS resource is not configured or not overloaded with the SRS-CB resource, the ATD may not affect the throughput of the Rx chain associated with the SRS-AS, and therefore, the UE may perform the ATD blanking to reduce the number of the SRS port to one TX chain associated with the SRS port in consideration of the UL traffic condition.

In another aspect, the ATD may drop the number of the SRS port to one TX chain associated with the SRS port based on both of the DL traffic and the UL traffic not being heavy and not being sensitive to latency when the SRS-AS resource is overloaded with the SRS-CB resource. That is, when the SRS-AS resource is overloaded with the SRS-CB resource, the ATD blanking to reduce the number of the SRS port to one TX chain associated with the SRS port may be performed in consideration of the UL traffic condition and the DL traffic condition.

Here, the UL traffic condition for the ATD blanking may be based on the UL throughput being low or the UL PDCP watermark being low. The UL traffic condition for the ATD blanking may also be based on the statistics of the MAC padding in a series of UL grants. The DL traffic condition for the ATD blanking may be based on the DL traffic being in a reduced throughput state. That is, when the DL traffic is in the reduced throughput state, the ATD blanking may be acceptable even if the DL throughput may be impacted by the SRS resource overloading and the ATD blanking.

In one aspect, the ATD blanking may be blocked (or disallowed) based on a bandwidth part (BWP) of the DL traffic. That is, the ATD blanking of the SRS port may be allowed based on the BWP allocated for the DL traffic being less than a threshold BW value (i.e., a small BWP), and the ATD blanking of the SRS port may be blocked based on the BWP allocated for the DL traffic being greater than or equal to the threshold BW value (i.e., a large BWP), as indicated in Table 2 below. When the blanking of the SRS port is allowed, the ATD blanking may be performed based on the UL conditions (e.g., low UL throughput and low UL PDCP watermark) and/or the condition of the power source. In case the ATD blanking and the ARD are allowed based on the small DL traffic BWP and the overloaded SRS resources, at least one Rx chain selected according to the ARD may be re-mapped to at least one physical antenna according to joint handling of the DL, which will be described in detail below.

TABLE 2

|  | SRS resources overloaded | SRS resources not overloaded (or AS not configured) |
| --- | --- | --- |
| Large BWP | SRS blanking blocked | SRS Blanking allowed (CB) |
| Small BWP | SRS Blanking allowed (CB + AS) Rx1 re-mapping | SRS Blanking allowed (CB) |

In another aspect, the ATD blanking may be blocked based on a number of active Rx chains. That is, the number of active Rx chains may indicate whether the DL throughput is high since, the lower number of active Rx chains may mean that the peak DL throughput is not expected, and/or one of the antenna may have a deteriorated performance. Accordingly, the ATD blanking of the SRS port may be allowed. A higher number of active Rx may refer that the peak DL throughput may be expected with good antenna performances, the ATD blanking of the SRS port may be blocked. For example, the blanking may be blocked for SRS configured with the overloaded resources based on four (4) ARD Rx chains being configured, and the blanking may be allowed based on two (2) ARD Rx chains being configured, as indicated in Table 3 below. When the blanking of the SRS port may be allowed, the ATD blanking may be performed based on the UL conditions (e.g., low UL throughput and low UL PDCP watermark) and/or the condition of the power source. In case the ATD blanking and the ARD are allowed based on the two (2) ARD Rx chains being configured and the overloaded SRS resources, at least one Rx chain selected according to the ARD may be re-mapped according to joint handling of the DL, which will be described in detail below.

TABLE 3

|  | SRS resources overloaded | SRS resources not overloaded (or AS not configured) |
| --- | --- | --- |
| ARD 4Rx | SRS blanking blocked | SRS Blanking allowed (CB) |
| ARD 2Rx | SRS Blanking allowed (CB + AS) Rx1 re-mapping | SRS Blanking allowed (CB) |

In another aspect, the ATD blanking may be blocked based on heavy DL traffic. That is, the ATD blanking may be blocked in the presence of heavy DL traffic since the ATD blanking because the ATD blanking may have an increased impact on the DL throughput when the DL traffic is heavy. The UE may detect whether the DL traffic is heavy, based on at least one of a density of DL grants, a configuration of supportable DL throughput, or application information of the DL (e.g., 4K video streaming is running). For example, the blanking may be blocked for SRS configured with the overloaded resources based on four (4) ARD Rx chains being configured with the heavy DL traffic, and the blanking may be allowed based on four (4) ARD Rx chains being configured with the non-heavy DL traffic or the two (2) ARD Rx chains being configured, as indicated in Table 4 below. When the blanking of the SRS port may be allowed, the ATD blanking may be performed based on the UL conditions (e.g., low UL throughput and low UL PDCP watermark) and/or the condition of the power source. In case the ATD blanking and the ARD are allowed based on the non-heavy DL traffic and the overloaded SRS resources, at least one Rx chain selected according to the ARD may be re-mapped according to joint handling of the DL, which will be described in detail below.

TABLE 4

|  | SRS resources overloaded | SRS resources not overloaded (or AS not configured) |
| --- | --- | --- |
| ARD 4Rx heavy DL traffic | SRS blanking blocked | SRS Blanking allowed (CB) |
| ARD 4Rx non-heavy DL traffic | SRS Blanking allowed (CB + AS) Rx1 re-mapping | SRS Blanking allowed (CB) |
| ARD 2Rx | SRS Blanking allowed (CB + AS) Rx1 re-mapping | SRS Blanking allowed (CB) |

In some aspects, the UE may support the ARD, and during the ARD state, the UE may blanking an SRS-AS. When the ARD is supported, and the number of the Rx chains is reduced, the UE may feedback or report channel state information (CSI) consistent with the reduced number of Rx chains. For example, if the number of the active Rx chain is reduced from four (4) to two (2) antennas, the UE may transmit, to the base station, the CSI report consistently with the two (2) Rx chains.

The UE may not indicate to the base station that the UE is in the ARD state with the reduced number of RX chains. However, since the base station may use the SRS to estimate the DL channels, the UE may blank the SRS ports associated with the disabled Rx ports so that the UE may receive all the packets transmitted from the base station through the active Rx chains.

In one case, the SRS-AS is configured, the SRS ports corresponding to the active Rx chains may be sounded, and the SRS ports corresponding to the inactive (or disabled) Rx chains may be blanked. For example, if the third and fourth Rx chains are associated with the second and third antennas based on the ARD, the SRS-AS ports corresponding to the third and fourth Rx chains associated with antenna 2 and 3 may be blanked, and the SRS-AS ports corresponding to the first and second Rx chains associated with the first and fourth antennas may be sounded. In case the UL-MIMO is configured, the SRS ports corresponding to the active Tx ports may be sounded.

In cases where the SRS is overloaded between the SRS-AS and the SRS-CR, the active Rx ports and the active Tx ports may be paired, and the paired active Rx port and active Tx port may be mapped to the same physical antennas. For example, referring to Table 5, the UE may disable the Rx ports associated with the inactive Tx ports, e.g., Dtx_1 and DTx_0, and pair the two active Rx ports Rx0 and Rx1 to the two active Tx ports, Tx0 and Tx1, respectively. The UE may map the first pair of active Tx port and Rx port, e.g., Tx0 and Rx0 pair, to the first physical antenna Ant_0. The UE may also map the second pair of active Tx port and Rx port, e.g., Tx1 and Rx1 pair, to the fourth physical antenna Ant_3. Accordingly, the UE may sound full first SRS resources SRS Res_0 for the SRS-CB, and also sound the full first SRS resources SRS Res_0 for the SRS-AS.

TABLE 5

|  | UL-MIMO | Tx chain mapping | Rx chain mapping | SRS-CB UL-MIMO | SRS-AS 2T4R for ARD 2Rx |
| --- | --- | --- | --- | --- | --- |
| Ant_0 | Tx0 | PTx_0 | Rx0 (active) | Sound SRS Res_0 | Sound SRS Res_0 |
| Ant_1 |  | DTx_1 | Rx3 (disabled) |  | Blank SRS Res_1 |
| Ant_2 |  | DTx_0 | Rx2 (disabled) |  | Blank SRS Res_1 |
| Ant_3 | Tx1 | PTx_1 | Rx1 (active) | Sound SRS Res_0 | Sound SRS Res_0 |

In some aspects, the UE may perform joint handling of the DL for the ATD blanking. For an SRS overloaded case, due to the ATD blanking, the second Tx chain Tx1 and the associated SRS-CB for UL-MIMO may be blanked. For example, referring to Table 6, the Tx1 mapped to the second primary Tx port PTx_1 may be blanked based on the ATD blanking. In turn, this may force the same SRS-AS associated with the Rx port to be blanked, and the base station may not receive the SRS-AS from the UE through the second Rx port, and the base station may not estimate the channel for the second Rx port, hurting the 2Rx DL throughput.

Accordingly, the UE may minimize or reduce the ATD blanking impact on the DL performance in the ARD 2Rx state by re-mapping the second Rx port Rx1 to another physical antenna that is not associated with the blanked Tx port. For example, the second Rx port Rx1 may be re-mapped to the third physical antenna Ant 2 from the fourth physical antenna Ant_3. The first Rx port Rx0 and the first Tx port Tx0 may still be paired and mapped to the first physical antenna Ant_0. The UE may select, among the two remaining physical antennas, e.g., Ant_1 and Ant_2, a more optimal antenna that may have a better metric, e.g., RSRP, SNR, etc. For example, the UE may select the third physical antenna Ant_2 for having the higher metric than the second physical antenna Ant_1 and re-map the second Rx port Rx1 to the third physical antenna Ant_2.

In another aspect, the UE may select one physical antenna with the worst metric, e.g., RSRP, SNR, etc., and blank the Tx port associated with the physical antenna with the worst metric. For example, the UE may determine to blank Tx1 based on the determination that the fourth physical antenna Ant_3 has the worst metric among the four physical antennas. Subsequently, the UE may select one antenna that has the second-best metric and re-map the second Rx port Rx1 to the one antenna that has the second-best metric. For example, the UE may determine that the third physical antenna Ant_2 has the second-best metric and re-map the second Rx port Rx1 to the third physical antenna Ant_2.

TABLE 6

| | UL-MIMO | Tx chain mapping | Rx chain mapping | SRS-CB UL-MIMO | SRS-AS 2T4R for ARD 2Rx |
|---|---|---|---|---|---|
| Ant_0 | Tx0 | PTx_0 | Rx0 (active) | Sound port 0 of SRS Res_0 | Sound port 0 of SRS Res_0 |
| Ant_1 | | DTx_1 | Rx3 (disabled) | | Blank port 1 of SRS Res_1 |
| Ant_2 | | DTx_0 | Rx1 (active) | | Sound port 0 of SRS Res_1 |
| Ant_3 | Tx1 (blanked) | PTx_1 | Rx1 (disabled) | Blank port 1 of SRS Res_0 | Blank port 1 of SRS Res_0 |

Figure 4:
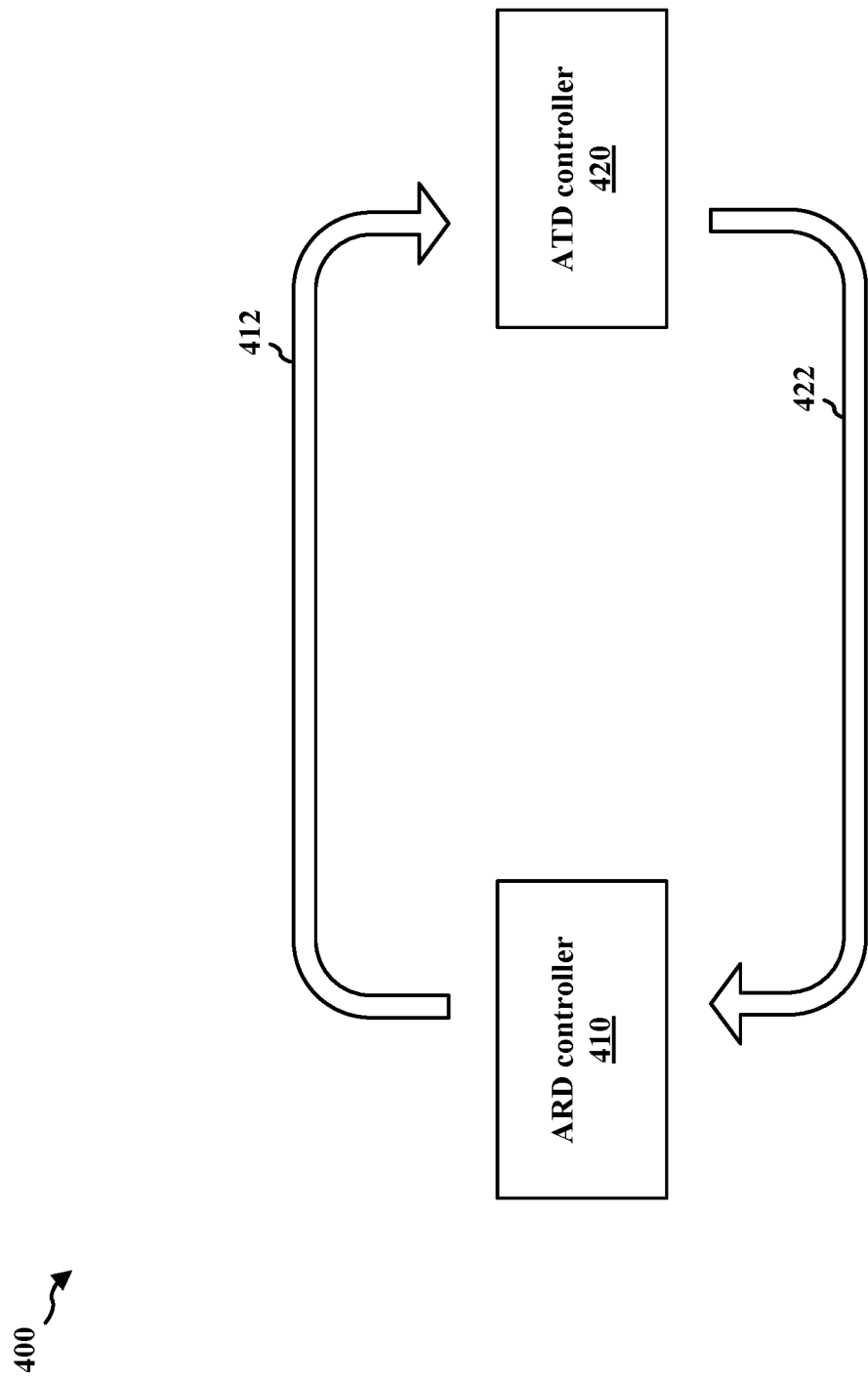
FIG. 4 is an example of adaptive transmit diversity (ATD) blanking of a method of wireless communication.

FIG. 4 is an example 400 of ATD blanking of a method of wireless communication. The example 400 may include an ARD controller 410 and an ATD controller 420 of a UE. The ATD blanking may be allowed or blocked based on at least one DL condition in response to the interactions between the ARD controller 410 and the ATD controller 420 at the UE. In some aspects, the SRS may be overloaded, and the ATD blanking may impact DL throughput.

The ARD controller 410 may determine, based on at least one DL traffic condition, that the heavy DL traffic may be affected by an ATD blanking. At 412, the ARD controller 410 may indicate the ATD controller 420 that ATD blanking should be blocked based on at least one DL traffic condition. Based on at least one DL traffic condition, the ATD controller 420 may determine whether the ATD blanking should be blocked. Here, the determination of whether the ATD blanking is allowed or blocked may be based on a number of DL traffic conditions.

First, the ATD blanking may be blocked based on a bandwidth part (BWP) of the DL traffic. That is, the ATD controller 420 may determine that the ATD blanking of the SRS port may be allowed based on the BWP allocated for the DL traffic being less than a threshold BW value (small BWP), and may determine that the ATD blanking of the SRS port may be blocked based on the BWP allocated for the DL traffic being greater than or equal to the threshold BW value (large BWP).

Second, the ATD blanking may be blocked based on a number of active Rx chains. That is, the number of active Rx chains may indicate whether the DL throughput is high since the lower number of active Rx may mean that the peak DL throughput is not expected, and/or one of the antennas may have a deteriorated performance. Accordingly, the ATD blanking of the SRS port may be allowed. A higher number of active Rx may refer that the peak DL throughput may be expected with good antenna performances, the ATD blanking of the SRS port may be blocked.

Third, the ATD blanking may be blocked based on heavy DL traffic. That is, the ATD blanking may be blocked in the presence of heavy DL traffic since the ATD blanking because the ATD blanking may have an increased impact on the DL throughput when the DL traffic is heavy. The UE may detect whether the DL traffic is heavy, based on at least one of a density of DL grants, a configuration of supportable DL throughput, or application information of the DL (e.g., 4K video streaming is running).

Fourth, the ATD blanking may be blocked based on a latency sensitivity for the DL traffic. That is, in case the latency specification of the DL traffic may be stringently configured, the ATD blanking may have an increased impact to the DL throughput and may be blocked.

Fifth, the ATD blanking may be blocked based on the application information of the DL traffic. The UE may infer that the ATD blanking may have an increased effect on the DL throughput based on the application information (e.g., which applications are running, etc.) and determine whether to block or allow the ATD Blanking.

When the ATD controller 420 is not blocked from performing the ATD blanking, the ATD controller 420 may consider the UL traffic to determine whether to perform the ATD blanking. That is, based on at least one UL traffic condition including one or more of an amount of the UL traffic being less than a UL traffic threshold or a latency sensitivity of the UL traffic being less than a latency threshold, the ATD controller 420 may determine to perform the ATD blanking. At 422, the ATD controller 420 may indicate the ARD controller 410 of the ATD blanking, and the ARD controller 410 may re-map at least one active Rx chain to at least one antenna port based on the disabled at least one Tx chain, wherein the at least one active Rx chain is paired with the disabled at least one Tx chain. The ARD controller 410 may unrepair the at least one active Rx chain from the at least one Tx chain that was blanked or disabled, and re-map the unrepaired at least one active Rx chain to one or more antennas unassociated with an active Tx chain or the disabled at least one Tx chain.

The SRS resources may be overloaded, and the ATD blanking may reduce the power consumption on UL. However, the ATD blanking may degrade the DL performance, affecting the DL energy efficiency. In one case, the blanked Tx antenna may correspond to an Rx antenna that is inactive due to ARD, and the Tx power and the Rx power may be saved from the ATD blanking. However, in general, the improved power efficiency in UL from the ATD blanking may cause power efficiency degradation in the DL, and a tradeoff between the UL energy efficiency and the DL energy efficiency may occur. The tradeoff may lead to different outcomes depending on the DL traffic, the UL traffic, or the channel condition. Accordingly, a unified framework may provide a joint decision of the ARD and ATD configuration, including the Tx and Rx antennas selection and/or blanking.

Figure 5:
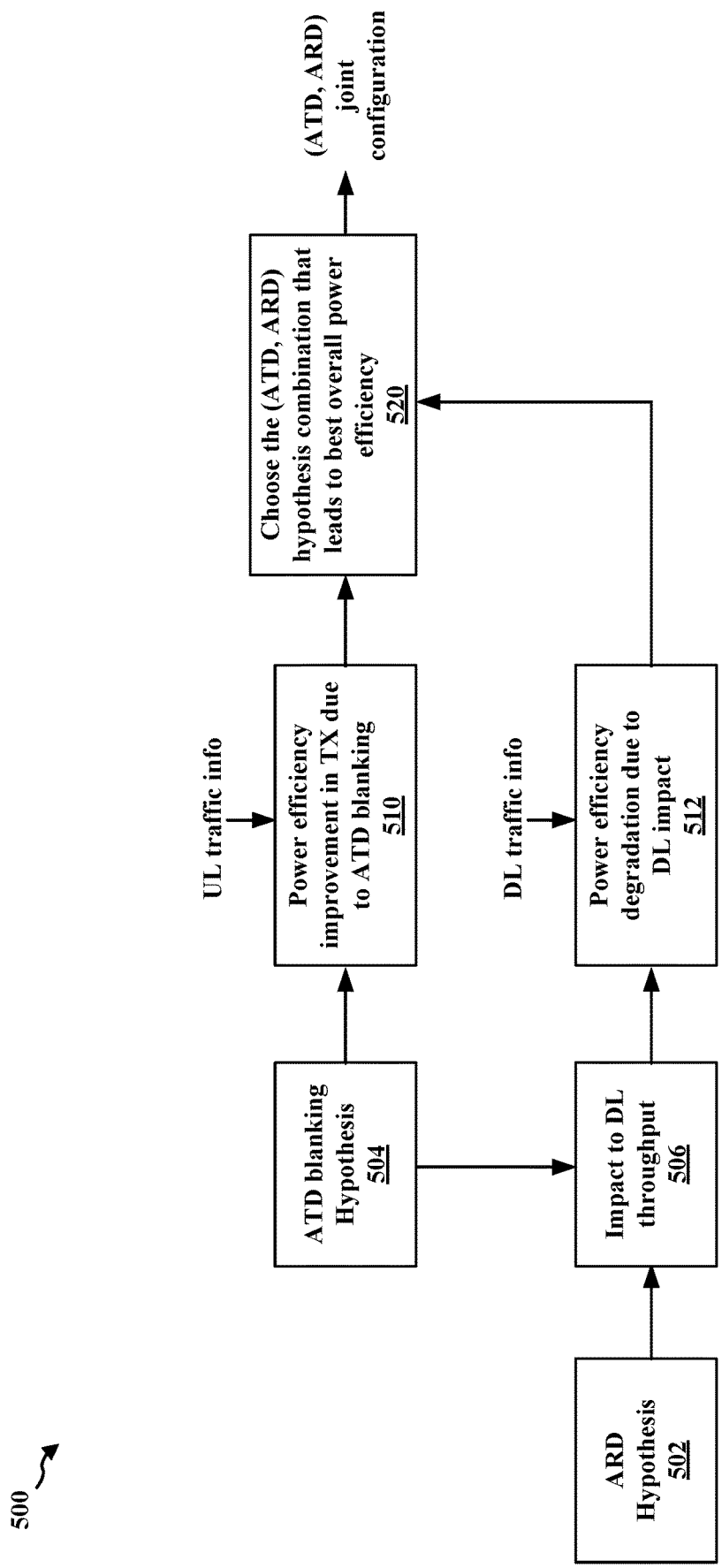
FIG. 5 is an example of architecture of a method of wireless communication.

FIG. 5 is an example of architecture 500 of a method of wireless communication. The example architecture 500 may illustrate jointly deciding the ARD and ATD configurations. The example architecture 500 may include an ARD hypothesis 502 and an ATD blanking hypothesis 504. For example, the ARD hypothesis 502 may indicate the number of Rx ports, e.g., 4Rx or 2Rx, and the ATD blanking hypothesis may indicate whether to blank one or more ports or not to blank any port. Based on the SRS resource overloading conditions and inputs from the ARD hypothesis 502 and the ATD blanking hypothesis 504, the impact on DL throughput 506 may be determined.

In one aspect, a power efficiency improvement in the TX from the ATD blanking 510 may be determined based on the ATD blanking hypothesis 504 and the UL traffic information. In another aspect, a power efficiency degradation from the DL impact 512 may be determined based on the impact to the DL throughput 506 and the DL traffic information. Accordingly, based on the power efficiency improvement in the TX from the ATD blanking 510 and the power efficiency degradation from the DL impact 512, the architecture 500 may choose a pair of ATD blanking and ARD hypothesis combinations that may lead to the best overall power efficiency (520) and determine the best ATD blanking and ARD hypothesis joint configuration.

Figure 6:
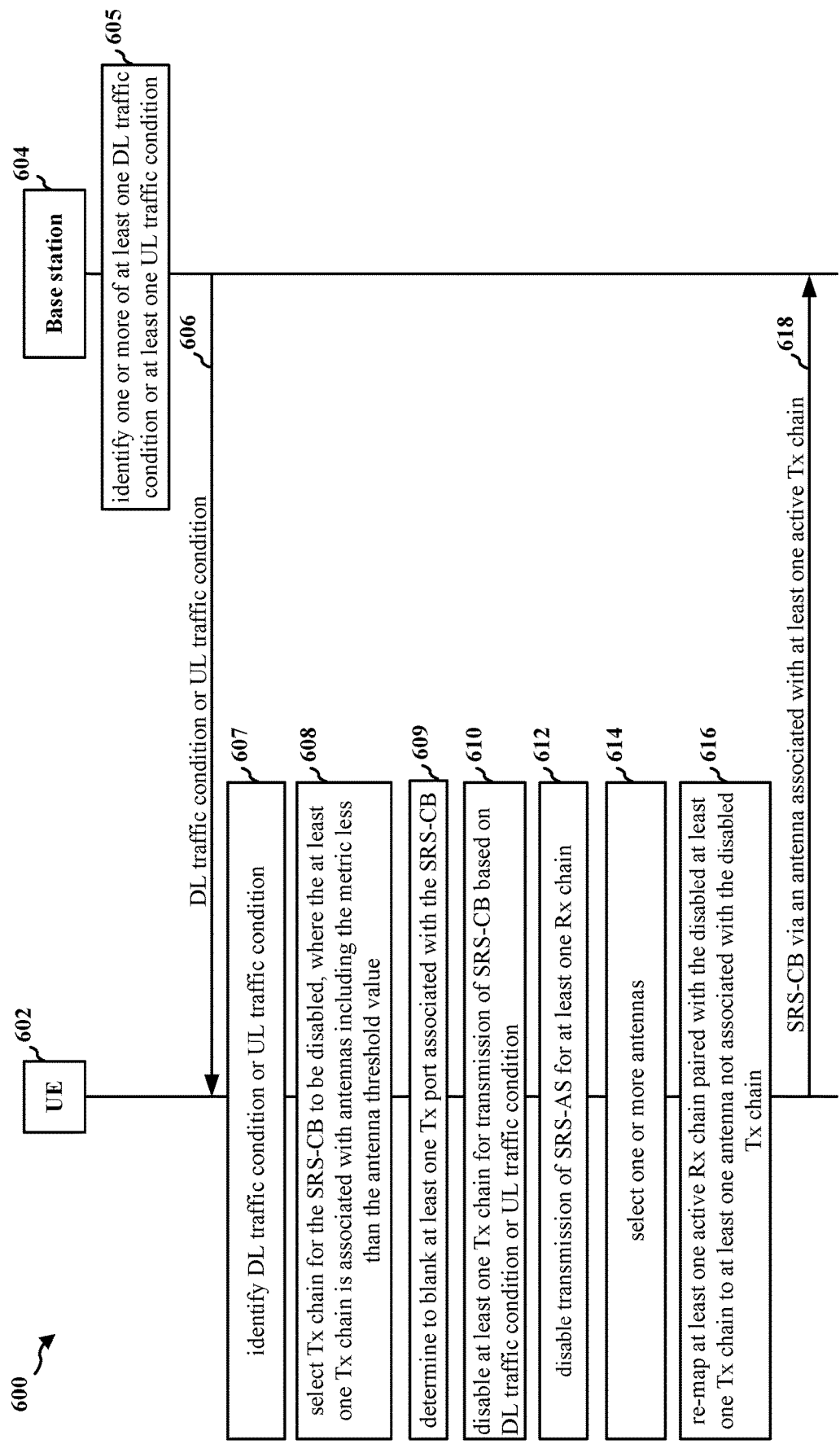
FIG. 6 is a call-flow diagram of a method of wireless communication.

FIG. 6 is a call-flow diagram 600 of a method of wireless communication. The call-flow diagram 600 may include a UE 602 and a base station 604. The UE 602 may make a joint decision of the ARD and ATD configuration, including the Tx and Rx antennas selection and/or blanking based on DL and UL traffic conditions. In one aspect, the base station 604 may identify at least a part of the DL and UL traffic conditions and transmit an indication of the part of the DL and UL traffic conditions to the UE 602.

At 605, the base station 604 may identify one or more of at least one DL traffic condition or at least one UL traffic condition, the at least one DL traffic condition or the at least one UL traffic condition being associated with a transmission of an SRS-CB. At 606, the base station 604 may transmit, to the UE 602, an indication of one or more of the at least one DL traffic condition or the at least one UL traffic condition. The UE 602 may receive one or more of at least one DL traffic condition or at least one UL traffic condition.

At 607, the UE 602 may identify the at least one DL traffic condition or at least one UL traffic condition. The at least one DL traffic condition may include one or more of an SRS-AS configuration, DL traffic, a BWP allocated for DL, or an ARD. The at least one UL traffic condition may include one or more of an amount of the UL traffic being less than a UL traffic threshold or a latency sensitivity of the UL traffic being less than a latency threshold. In one aspect, the UE 602 may receive one or more of at least one DL traffic condition or at least one UL traffic condition. In another aspect, the UE 602 may identify the at least one DL traffic condition or the at least one UL traffic condition. That is, the UE 602 may identify the at least one DL traffic condition or the at least one UL traffic condition based on at least one of a DL scheduling, UL traffic initiated in the UE, SRS overloading condition in the RRC configuration, etc.

At 608, the UE 602 may select at least one Tx chain for the SRS-CB to be disabled, where at least one Tx chain is associated with one or more other antennas, including the metric less than the antenna threshold value. That is, the UE 602 may select one physical antenna with the worst metric, e.g., RSRP, SNR, etc., and blank the Tx port associated with the physical antenna with the worst metric.

At 609, the UE 602 may determine to blank at least one Tx port associated with the SRS-CB. That is, based on one or more of at least one DL traffic condition or at least one UL traffic condition, the UE 602 may determine to blank at least one Tx port associated with the SRS-CB, where the at least one Tx chain may be disabled for the transmission of the SRS-CB based on the determining to blank at least one Tx port associated with the SRS-CB.

At 610, the UE 602 may disable at least one Tx chain for the transmission of an SRS-CB based on one or more of at least one DL traffic condition or at least one UL traffic condition. In one aspect, the UE 602 may disable at least one Tx chain selected at 608. At least one Tx chain may be disabled further based on an SRS-AS resource allocated for the SRS-AS being overloaded with an SRS CB resource. In one aspect, at least one Tx chain may be disabled further based on the BWP allocated for DL being less than a threshold BW value. In another aspect, at least one Tx chain may be disabled further based on the SRS-AS not being configured or an SRS-AS resource allocated for the SRS-AS not being overloaded with an SRS-CB resource. In another aspect, at least one Tx chain may be disabled further based on a number of Rx chains configured for the ARD being less than a threshold value. In another aspect, at least one Tx chain may be disabled further based on a number of Rx chains configured for the ARD being greater than or equal to a threshold value and an amount of the DL traffic being less than a DL traffic threshold. The amount of the DL traffic may be based on at least one of a density of DL grants, a configuration of supportable DL throughput, or application information of the DL. In another aspect, at least one Tx chain may be disabled for the transmission of the SRS-CB further based on a voltage level of a power source of the UE 602 being less than a power threshold.

At 612, the UE 602 may disable the transmission of SRS-AS for at least one Rx chain. In one aspect, the UE 602 may support the ARD and reduce the number of the Rx chains based on the ARD. In cases where the SRS is overloaded between the SRS-AS and the SRS-CR, the active Rx ports and the active Tx ports may be paired, and the paired active Rx port and active Tx port may be mapped to the same physical antennas.

At 614, the UE 602 may select one or more antennas. In one aspect, the one or more antennas include a metric greater than an antenna threshold value. In another aspect, the one or more antennas include a metric greater than other antennas. In some aspects, the UE 602 may perform joint handling of the DL for the ATD blanking. The UE 602 may minimize or reduce the ATD blanking impact on the DL performance in the ARD 2Rx state by re-mapping the second Rx port Rx1 to another physical antenna that is not associated with the blanked Tx port. The UE 602 may select a more optimal antenna that may have better metrics, e.g., RSRP, SNR, etc. In another aspect, the UE 602 may select one antenna that has the second-best metric.

At 616, the UE 602 may re-map at least one active Rx chain paired with the disabled at least one Tx chain to at least one antenna not associated with the disabled at least one Tx chain. In one aspect, each of the at least one active Rx chain may be paired with one active Tx chain, and the pair of the active Rx chain and the active Tx chain may be mapped to a same antenna. In another aspect, at least one active Rx chain may be re-mapped to one or more antennas unassociated with an active Tx chain or the disabled at least one Tx chain. For example, the UE 602 may re-map at least one active Rx chain to one or more antennas selected at 614.

At 618, the UE 602 may transmit, to the base station 604, upon disabling the at least one Tx chain, the SRS-CB via an antenna associated with at least one active Tx chain. The base station 604 may receive, from the UE 602, the SRS-CB associated with the at least one DL traffic condition or the at least one UL traffic condition. The base station 604 may use the SRS-CB to estimate the UL channels, and the UE 602 may transmit the UL channels via the active at least one Tx chain.

Figure 7:
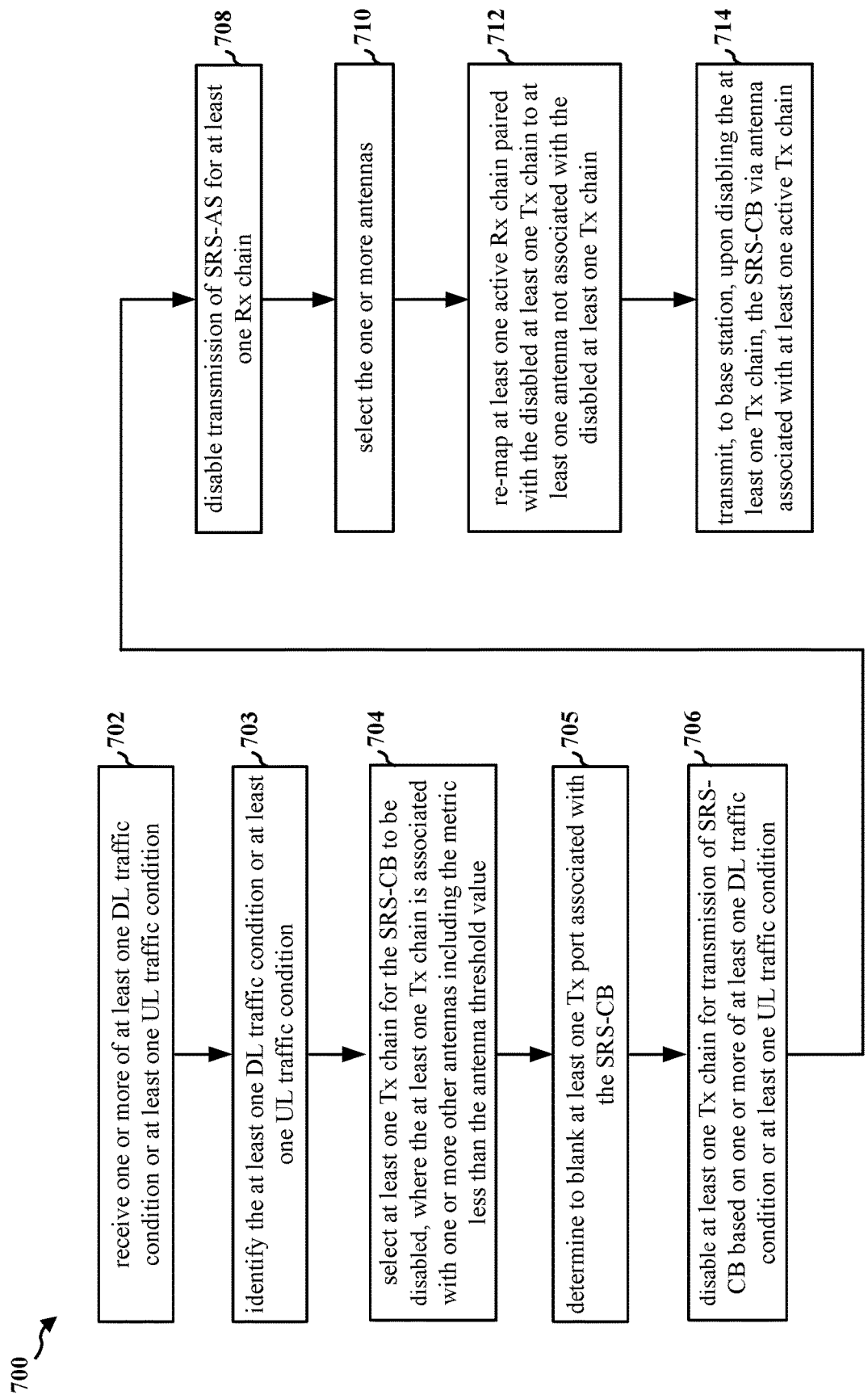
FIG. 7 is a flowchart of a method of wireless communication.

FIG. 7 is a flowchart 700 of a method of wireless communication. The method may be performed by a UE (e.g., the UE 104/602; the apparatus 902). The UE may make a joint decision of the ARD and ATD configuration, including the Tx and Rx antennas selection and/or blanking based on DL and UL traffic conditions.

At 702, the UE may receive one or more of at least one DL traffic condition or at least one UL traffic condition. At 703, the UE may identify the at least one DL traffic condition or at least one UL traffic condition. The at least one DL traffic condition may include one or more of an SRS-AS configuration, DL traffic, a BWP allocated for DL, or an ARD. The at least one UL traffic condition may include one or more of an amount of the UL traffic being less than a UL traffic threshold or a latency sensitivity of the UL traffic being less than a latency threshold. In one aspect, the UE may receive one or more of at least one DL traffic condition or at least one UL traffic condition. In another aspect, the UE may identify the at least one DL traffic condition or the at least one UL traffic condition. That is, the UE may identify the at least one DL traffic condition or the at least one UL traffic condition based on at least one of a DL scheduling, UL traffic initiated in the UE, SRS overloading condition in the RRC configuration, etc. For example, at 606, the UE 602 may receive one or more of at least one DL traffic condition or at least one UL traffic condition, and at 607, the UE may identify the at least one DL traffic condition or at least one UL traffic condition. Furthermore, 702 and 703 may be performed by a DL/UL traffic condition component 940.

At 704, the UE may select at least one Tx chain for the SRS-CB to be blanked, where at least one Tx chain is associated with one or more other antennas, including the metric less than the antenna threshold value. That is, the UE may select one physical antenna with the worst metric, e.g., RSRP, SNR, etc., and blank the Tx port associated with the physical antenna with the worst metric. For example, at 608, the UE 602 may select at least one Tx chain for the SRS-CB to be disabled, where at least one Tx chain is associated with one or more other antennas, including the metric less than the antenna threshold value. Furthermore, 704 may be performed by an antenna configuring component 946.

At 705, the UE may determine to blank at least one Tx port associated with the SRS-CB. That is, based on one or more of at least one DL traffic condition or at least one UL traffic condition, the UE may determine to blank at least one Tx port associated with the SRS-CB, where the at least one Tx chain may be disabled for the transmission of the SRS-CB based on the determining to blank at least one Tx port associated with the SRS-CB. For example, at 609, the UE 602 may determine to blank at least one Tx port associated with the SRS-CB. Furthermore, 705 may be performed by an ATD blanking component 942.

At 706, the UE may disable at least one Tx chain for the transmission of an SRS-CB based on one or more of at least one DL traffic condition or at least one UL traffic condition. In one aspect, the UE 602 may disable at least one Tx chain selected at 704. At least one Tx chain may be disabled further based on an SRS-AS resource allocated for the SRS-AS being overloaded with an SRS CB resource. In one aspect, at least one Tx chain may be disabled further based on the BWP allocated for DL being less than a threshold BW value. In another aspect, at least one Tx chain may be disabled further based on the SRS-AS not being configured or an SRS-AS resource allocated for the SRS-AS not being overloaded with an SRS-CB resource. In another aspect, at least one Tx chain may be disabled further based on a number of Rx chains configured for the ARD being less than a threshold value. In another aspect, at least one Tx chain may be disabled further based on a number of Rx chains configured for the ARD being greater than or equal to a threshold value and an amount of the DL traffic being less than a DL traffic threshold. The amount of the DL traffic may be determined based on at least one of a density of DL grants, a configuration of supportable DL throughput, or application information of the DL. In another aspect, at least one Tx chain may be disabled for the transmission of the SRS-CB further based on a voltage level of a power source of the UE 602 being less than a power threshold. For example, at 610, the UE 602 may disable at least one Tx chain for the transmission of an SRS-CB based on one or more of at least one DL traffic condition or at least one UL traffic condition. Furthermore, 706 may be performed by an ATD blanking component 942.

At 708, the UE may disable the transmission of SRS-AS for at least one Rx chain. In one aspect, the UE may support the ARD and reduce the number of the Rx chains based on the ARD. In cases that the SRS is overloaded between the SRS-AS and the SRS-CR, the active Rx ports and the active Tx ports may be paired, and the paired active Rx port and active Tx port may be mapped to the same physical antennas. For example, at 612, the UE 602 may disable the transmission of SRS-AS for at least one Rx chain. Furthermore, 708 may be performed by an ARD component 944.

At 710, the UE may select one or more antennas. In one aspect, the one or more antennas include a metric greater than an antenna threshold value. In another aspect, the one or more antennas include a metric greater than other antennas. In some aspects, the UE may perform joint handling of the DL for the ATD blanking. The UE may minimize or reduce the ATD blanking impact on the DL performance in the ARD 2Rx state by re-mapping the second Rx port Rx1 to another physical antenna that is not associated with the blanked Tx port. The UE may select a more optimal antenna that may have better metrics, e.g., RSRP, SNR, etc. In another aspect, the UE may select one antenna that has the second-best metric. For example, at 614, the UE 602 may select one or more antennas. Furthermore, 710 may be performed by the antenna configuring component 946.

At 712, the UE may re-map at least one active Rx chain paired with the disabled at least one Tx chain to at least one antenna not associated with the disabled at least one Tx chain. In one aspect, each of the at least one active Rx chain may be paired with one active Tx chain, and the pair of the active Rx chain and the active Tx chain may be mapped to a same antenna. In another aspect, at least one active Rx chain may be re-mapped to one or more antennas unassociated with an active Tx chain or the disabled at least one Tx chain. For example, the UE may re-map at least one active Rx chain to one or more antennas selected at 710. For example, at 616, the UE 602 may re-map at least one active Rx chain paired with the disabled at least one Tx chain to at least one antenna not associated with the disabled at least one Tx chain. Furthermore, 712 may be performed by the antenna configuring component 946.

At 714, the UE may transmit, to the base station, the SRS-CB via an antenna associated with at least one active Tx chain, upon disabling the at least one Tx chain. The base station may use the SRS-CB to estimate the UL channels, and the UE may transmit the UL channels via the active at least one Tx chain. For example, at 618, the UE 602 may transmit, to the base station 604, upon disabling the at least one Tx chain, the SRS-CB via an antenna associated with at least one active Tx chain. Furthermore, 714 may be performed by an SRS component 948.

Figure 8:
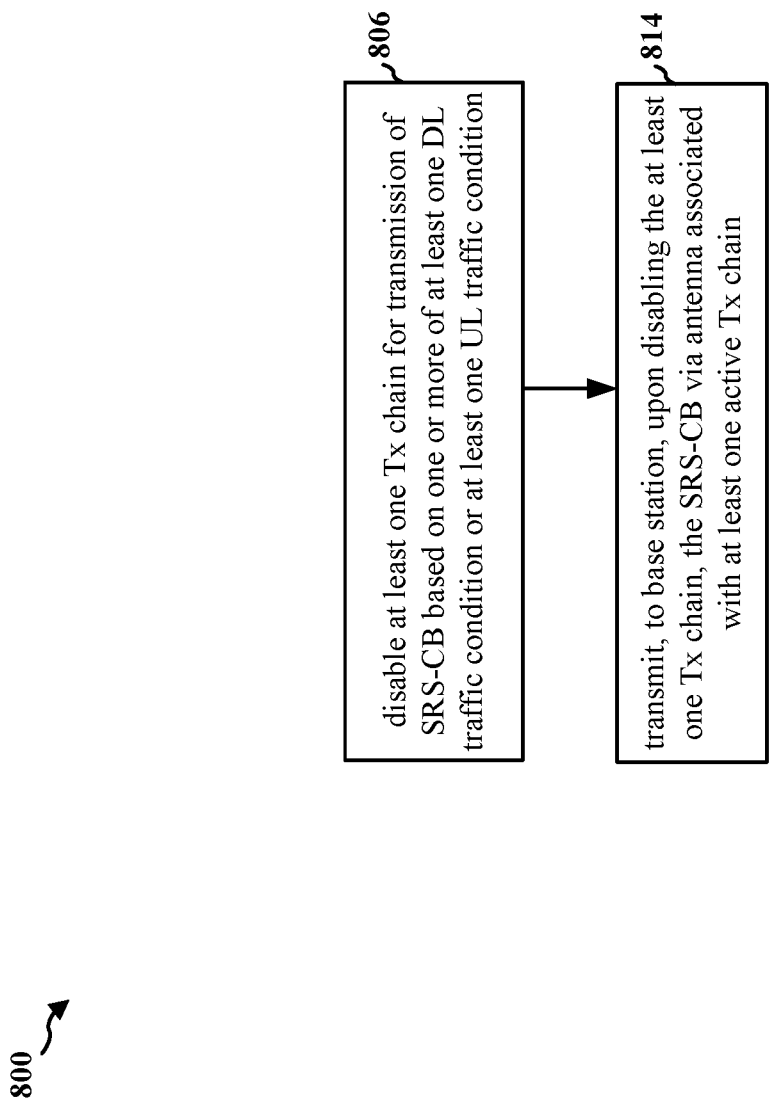
FIG. 8 is a flowchart of a method of wireless communication.

FIG. 8 is a flowchart 800 of a method of wireless communication. The method may be performed by a UE (e.g., the UE 104/602; the apparatus 902). The UE may make a joint decision of the ARD and ATD configuration, including the Tx and Rx antennas selection and/or blanking based on DL and UL traffic conditions.

At 806, the UE may disable at least one Tx chain for the transmission of an SRS-CB based on one or more of at least one DL traffic condition or at least one UL traffic condition. In one aspect, the UE 602 may disable at least one Tx chain selected at 804. At least one Tx chain may be disabled further based on an SRS-AS resource allocated for the SRS-AS being overloaded with an SRS CB resource. In one aspect, at least one Tx chain may be disabled further based on the BWP allocated for DL being less than a threshold BW value. In another aspect, at least one Tx chain may be disabled further based on the SRS-AS not being configured or an SRS-AS resource allocated for the SRS-AS not being overloaded with an SRS-CB resource. In another aspect, at least one Tx chain may be disabled further based on a number of Rx chains configured for the ARD being less than a threshold value. In another aspect, at least one Tx chain may be disabled further based on a number of Rx chains configured for the ARD being greater than or equal to a threshold value and an amount of the DL traffic being less than a DL traffic threshold. The amount of the DL traffic may be determined based on at least one of a density of DL grants, a configuration of supportable DL throughput, or application information of the DL. In another aspect, at least one Tx chain may be disabled for the transmission of the SRS-CB further based on a voltage level of a power source of the UE 602 being less than a power threshold. For example, at 610, the UE 602 may disable at least one Tx chain for the transmission of an SRS-CB based on one or more of at least one DL traffic condition or at least one UL traffic condition. Furthermore, 806 may be performed by an ATD blanking component 942.

At 814, the UE may transmit, to the base station, the SRS-CB via an antenna associated with at least one active Tx chain, upon disabling the at least one Tx chain. The base station may use the SRS-CB to estimate the UL channels, and the UE may transmit the UL channels via the active at least one Tx chain. For example, at 618, the UE 602 may transmit, to the base station 604, upon disabling the at least one Tx chain, the SRS-CB via an antenna associated with at least one active Tx chain. Furthermore, 814 may be performed by an SRS component 948.

Figure 9:
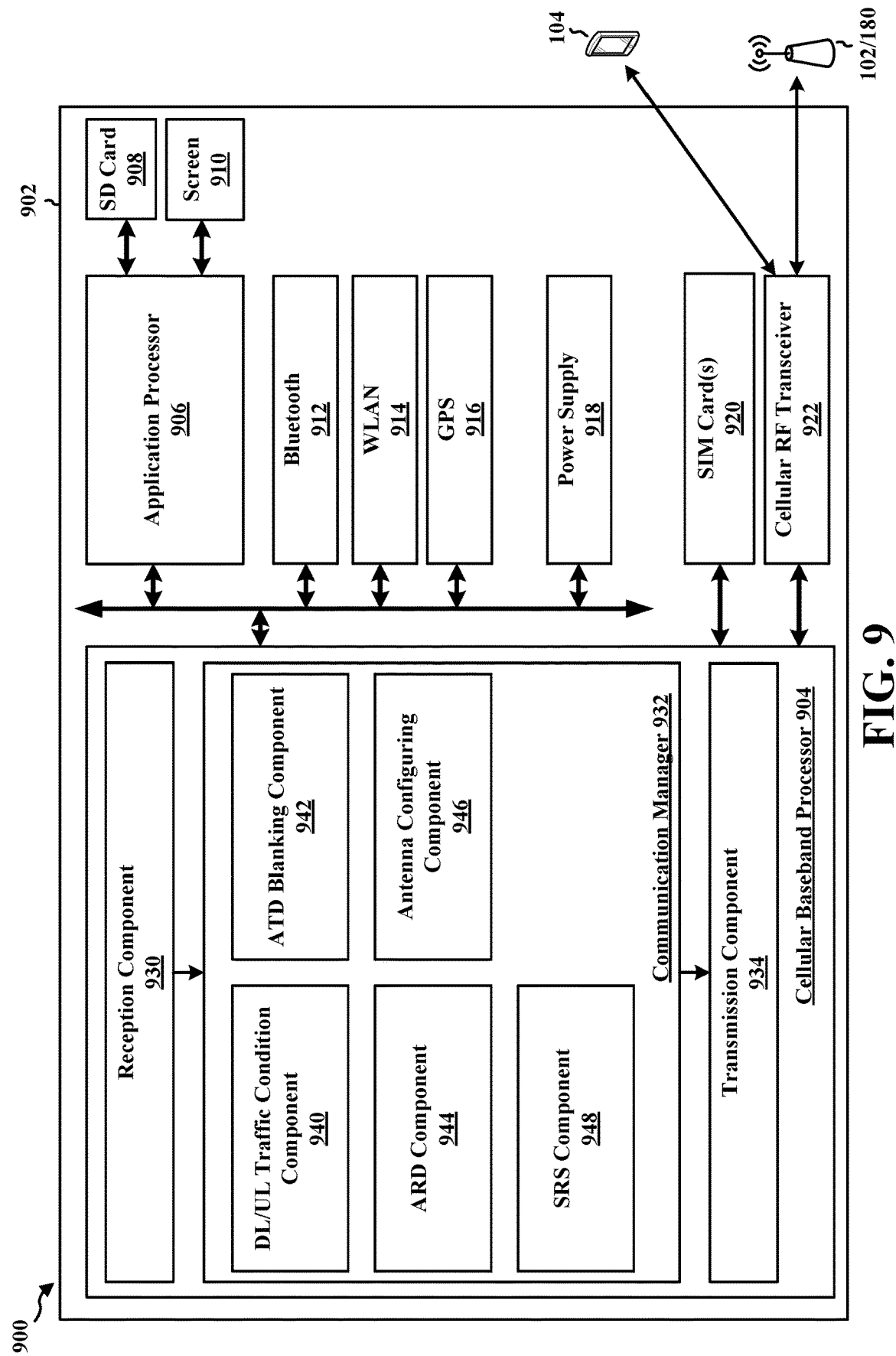
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a DL/UL traffic condition component 940 that is configured to receive or identify one or more of at least one DL traffic condition or at least one UL traffic condition, e.g., as described in connection with 702 and 703. The communication manager 932 further includes an ATD blanking component 942 that is configured to determine to blank at least one Tx port associated with the SRS-CB, and disable at least one Tx chain for the transmission of an SRS-CB based on one or more of at least one DL traffic condition or at least one UL traffic condition, e.g., as described in connection with 705, 706, and 806. The communication manager 932 includes an ARD component 944 that is configured to disable the transmission of SRS-AS for at least one Rx chain, and re-map at least one active Rx chain paired with the disabled at least one Tx chain to at least one antenna not associated with the disabled at least one Tx chain, e.g., as described in connection with 708 and 712. The communication manager 932 further includes an antenna configuring component 946 that is configured to re-map at least one active Rx chain to at least one antenna based on the disabled at least one Tx chain, and select one or more antennas, where the one or more antennas include a metric greater than an antenna threshold value, e.g., as described in connection with 704 and 710. The communication manager 932 includes an SRS component 948 that is configured to transmit, to the base station, the SRS-CB via an antenna associated with at least one active Tx chain, upon disabling the at least one Tx chain, e.g., as described in connection with 714 and 814.

The apparatus may include additional components that perform each of the blocks of the algorithm in the flowcharts of FIGS. 6, 7, and 8. As such, each block in the flowcharts of FIGS. 6, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for disabling at least one Tx chain for a transmission of a SRS-CB based on one or more of at least one DL traffic condition or at least one UL traffic condition, means for transmitting, to a base station, upon disabling the at least one Tx chain, the SRS-CB via an antenna associated with at least one active Tx chain, and means for determining to blank at least one Tx port associated with the SRS-CB. The apparatus 902 includes means for disabling the transmission of SRS-AS for at least one Rx chain, and re-map at least one active Rx chain to at least one antenna based on the disabled at least one Tx chain, where the at least one active Rx chain is paired with the disabled at least one Tx chain. The apparatus 902 includes means for selecting the one or more antennas, where the one or more antennas include a metric greater than an antenna threshold value, and means for selecting the at least one Tx chain for the SRS-CB to be disabled, where the at least one Tx chain is associated with one or more other antennas including the metric less than the antenna threshold value. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
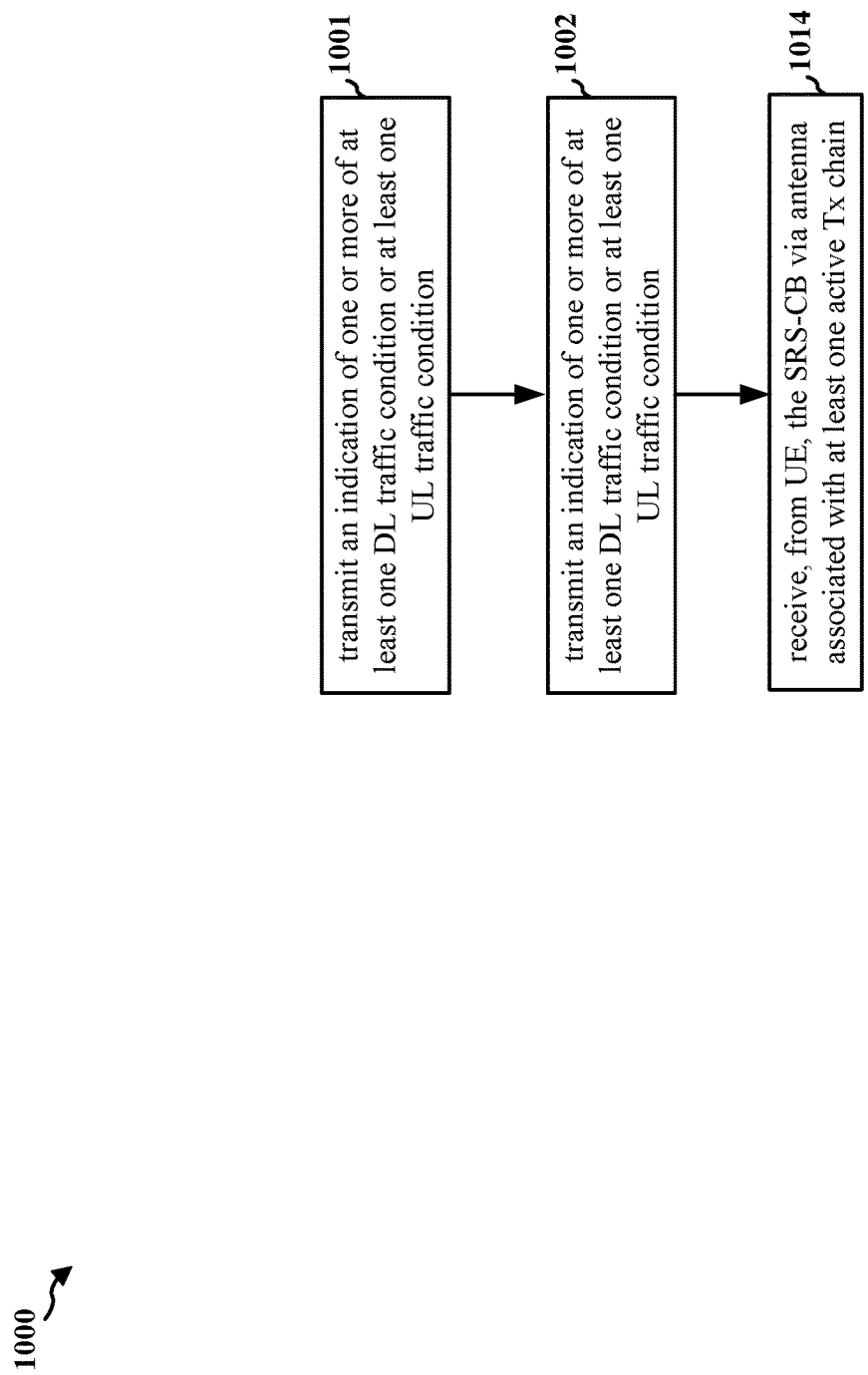
FIG. 10 is a flowchart of a method of wireless communication.

FIG. 10 is a flowchart 1000 of a method of wireless communication. The method may be performed by a base station (e.g., the base station 102/180/604; the apparatus 1102). The base station may identify the DL and UL traffic conditions and transmit an indication of the DL and UL traffic conditions to the UE, and the UE may make a joint decision of the ARD and ATD configuration, including the Tx and Rx antennas selection and/or blanking based on DL and UL traffic conditions.

At 1001, the base station may identify one or more of at least one DL traffic condition or at least one UL traffic condition. Here, the at least one DL traffic condition or the at least one UL traffic condition may be associated with a transmission of an SRS-CB. For example, at 605, the base station 604 may identify one or more of at least one DL traffic condition or at least one UL traffic condition. Furthermore, 1001 may be performed by a DL/UL traffic condition component 1140.

At 1002, the base station may transmit, to the UE, an indication of one or more of the at least one DL traffic condition or the at least one UL traffic condition. In one aspect, at least one DL traffic condition may include one or more of an SRS-AS configuration, DL traffic, a BWP allocated for DL, or an ARD. In another aspect, at least one UL traffic condition may include one or more of an amount of the UL traffic being less than a UL traffic threshold or a latency sensitivity of the UL traffic being less than a latency threshold. For example, at 606, the base station 604 may transmit, to the UE 602, an indication of one or more of the at least one DL traffic condition or the at least one UL traffic condition. Furthermore, 1002 may be performed by the DL/UL traffic condition component 1140.

At 1014, the base station may receive, from the UE, the SRS-CB associated with the at least one DL traffic condition or the at least one UL traffic condition. The base station may use the SRS-CB to estimate the UL channels, and the UE may transmit the UL channels via the active at least one Tx chain. For example, at 618, the base station 604 may receive, from the UE 602, the SRS-CB associated with the at least one DL traffic condition or the at least one UL traffic condition. Furthermore, 1014 may be performed by an SRS component 1148.

Figure 11:
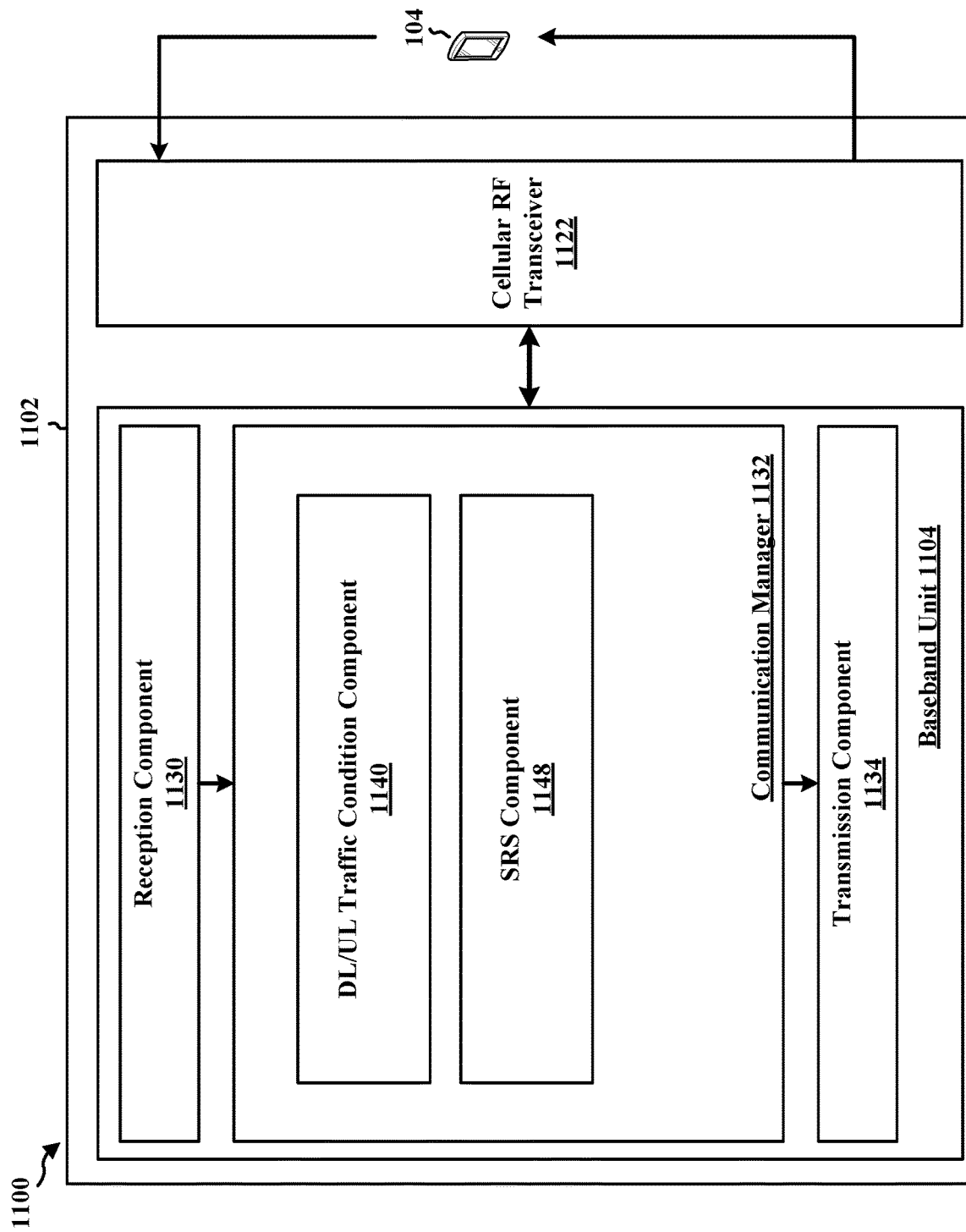
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1002 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a DL/UL traffic condition component 1140 that is configured to identify one or more of at least one DL traffic condition or at least one UL traffic condition, and transmit an indication of one or more of at least one DL traffic condition or at least one UL traffic condition, e.g., as described in connection with 1001 and 1002. The communication manager 1132 further includes an SRS component 1148 that is configured to receive, from the UE, the SRS-CB associated with the at least one DL traffic condition or the at least one UL traffic condition, e.g., as described in connection with 1014.

The apparatus may include additional components that perform each of the blocks of the algorithm in the flowcharts of FIGS. 6 and 10. As such, each block in the flowcharts of FIGS. 6 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for identifying one or more of at least one DL traffic condition or at least one UL traffic condition, the at least one DL traffic condition or the at least one UL traffic condition being associated with a transmission of an SRS-CB, means for transmitting, to a UE, an indication of one or more of the at least one DL traffic condition or the at least one UL traffic condition, and means for receiving, from the UE, the SRS-CB associated with the at least one DL traffic condition or the at least one UL traffic condition. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

A UE may make a joint decision of ARD and ATD configurations, including the Tx and Rx antennas selection and/or blanking based on DL and UL traffic conditions. The UE may disable at least one Tx chain for a transmission of an SRS-CB based on one or more of at least one DL traffic condition or at least one UL traffic condition, and transmit, to a base station, upon disabling the at least one Tx chain, the SRS-CB via an antenna associated with at least one active Tx chain. The base station may identify one or more of at least one DL traffic condition or at least one UL traffic condition, the at least one DL traffic condition or the at least one UL traffic condition being associated with a transmission of an SRS-CB, transmit, to a UE, an indication of one or more of the at least one DL traffic condition or the at least one UL traffic condition, and receive, from the UE, the SRS-CB associated with the at least one DL traffic condition or the at least one UL traffic condition.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to disable at least one Tx chain for a transmission of a SRS-CB based on one or more of at least one DL traffic condition or at least one UL traffic condition, and transmit, to a base station, upon disabling the at least one Tx chain, the SRS-CB via an antenna associated with at least one active Tx chain.

Aspect 2 is the apparatus of aspect 1, where the at least one DL traffic condition includes one or more of an SRS-AS configuration, DL traffic, a BWP allocated for DL, or an ARD.

Aspect 3 is the apparatus of aspect 2, where the at least one Tx chain is disabled further based on the SRS-AS not being configured or an SRS-AS resource allocated for the SRS-AS not being overloaded with an SRS-CB resource.

Aspect 4 is the apparatus of any of aspects 2 and 3, where the at least one Tx chain is disabled further based on the BWP allocated for DL being less than a threshold BW value.

Aspect 5 is the apparatus of any of aspects 2 to 4, where the at least one Tx chain is disabled further based on the BWP allocated for DL being less than a threshold BW value.

Aspect 6 is the apparatus of any of aspects 2 to 5, where the at least one Tx chain is disabled further based on a number of Rx chains configured for the ARD being greater than or equal to a threshold value and an amount of the DL traffic being less than a DL traffic threshold.

Aspect 7 is the apparatus of aspect 6, where the amount of the DL traffic is based on at least one of a density of DL grants, a configuration of supportable DL throughput, or an application information of the DL.

Aspect 8 is the apparatus of any of aspects 2 and 7, where the at least one Tx chain is disabled further based on an SRS-AS resource allocated for the SRS-AS being overloaded with an SRS CB resource, and where the at least one processor and the memory are further configured to disable a transmission of SRS-AS for at least one Rx chain, and re-map at least one active Rx chain paired with the disabled at least one Tx chain to at least one antenna not associated with the disabled at least one Tx chain.

Aspect 9 is the apparatus of aspect 8, where each of the at least one active Rx chain is paired with one active Tx chain, and the pair of the active Rx chain and the active Tx chain is mapped to a same antenna.

Aspect 10 is the apparatus of any of aspects 8 and 9, where the at least one active Rx chain is re-mapped to one or more antennas unassociated with an active Tx chain or the disabled at least one Tx chain.

Aspect 11 is the apparatus of aspect 10, where the at least one processor and the memory are further configured to select the one or more antennas, where the one or more antennas include a metric greater than an antenna threshold value.

Aspect 12 is the apparatus of aspect 11, where the at least one processor and the memory are further configured to select the at least one Tx chain for the SRS-CB to be disabled, where the at least one Tx chain is associated with one or more other antennas including the metric less than the antenna threshold value.

Aspect 13 is the apparatus of any of aspects 10 to 12, where the at least one processor and the memory are further configured to select the one or more antennas, wherein the one or more antennas include a metric greater than other antennas.

Aspect 14 is the apparatus of any of aspects 1 to 13, where the at least one UL traffic condition includes one or more of an amount of the UL traffic being less than a UL traffic threshold or a latency sensitivity of the UL traffic being less than a latency threshold.

Aspect 15 is the apparatus of any of aspects 1 to 14, where the at least one Tx chain is disabled for the transmission of the SRS-CB further based on a voltage level of a power source of the UE being less than a power threshold.

Aspect 16 is the apparatus of any of aspects 1 to 15, further including a transceiver coupled to the at least one processor, where the at least one processor and the memory are further configured to determine to blank at least one Tx port associated with the SRS-CB, and the at least one Tx chain is disabled for the transmission of the SRS-CB based on the determining to blank at least one Tx port associated with the SRS-CB.

Aspect 17 is a method of wireless communication for implementing any of aspects 1 to 16.

Aspect 18 is an apparatus for wireless communication including means for implementing any of aspects 1 to 16.

Aspect 19 is a computer-readable medium storing computer executable code, where the code when executed by a processor causes the processor to implement any of aspects 1 to 16.

Aspect 20 is an apparatus for wireless communication at a base station including at least one processor coupled to a memory and configured to identify one or more of at least one DL traffic condition or at least one UL traffic condition, the at least one DL traffic condition or the at least one UL traffic condition being associated with a transmission of an SRS-CB, transmit, to a UE, an indication of one or more of the at least one DL traffic condition or the at least one UL traffic condition, and receive, from the UE, the SRS-CB associated with the at least one DL traffic condition or the at least one UL traffic condition.

Aspect 21 is a method of wireless communication for implementing aspect 20.

Aspect 22 is an apparatus for wireless communication including means for implementing aspect 20.

Aspect 23 is a computer-readable medium storing computer executable code, where the code when executed by a processor causes the processor to implement aspect 20.

What is claimed is:

1. A user equipment (UE) for wireless communication, comprising:
    memory; and
    at least one processor coupled to the memory, wherein the UE is configured to:
        disable, based on at least one condition, at least one transmit (Tx) chain for a transmission of a codebook-based sounding reference signal (SRS-CB); and
        transmit, based on disabling the at least one Tx chain, the SRS-CB via an antenna associated with at least one active Tx chain, wherein the at least one condition includes SRS antenna switching (SRS-AS) not being configured.

2. The UE of claim 1, wherein the at least one condition includes a voltage level of a power source of the UE being less than a power threshold.

3. The UE of claim 1, further comprising a transceiver coupled to the at least one processor.

4. A user equipment (UE) for wireless communication, comprising:
    memory; and
    at least one processor coupled to the memory, wherein the UE is configured to:
        disable, based on a sounding reference signal for antenna switching (SRS-AS) resource being overloaded with a codebook-based SRS (SRS-CB) resource, at least one transmit (Tx) chain for a transmission of an SRS-CB;
        disable SRS-AS transmission for at least one receive (Rx) chain; and
        re-map at least one active Rx chain paired with the disabled at least one Tx chain to at least one antenna not associated with the disabled at least one Tx chain.

5. The UE of claim 4, wherein each of the at least one active Rx chain is paired with one active Tx chain, and the pair of the active Rx chain and the active Tx chain is mapped to a same antenna.

6. The UE of claim 4, wherein the at least one active Rx chain is re-mapped to one or more antennas unassociated with an active Tx chain or the disabled at least one Tx chain.

7. The UE of claim 6, wherein the one or more antennas correspond to a metric greater than an antenna threshold value.

8. The UE of claim 7, wherein the at least one Tx chain is associated with one or more other antennas corresponding to the metric less than the antenna threshold value.

9. The UE of claim 6, wherein the one or more antennas correspond to a metric greater than other antennas.

10. A user equipment (UE) for wireless communication, comprising:
    memory; and
    at least one processor coupled to the memory, wherein the UE is configured to:
        disable, based on one or more of at least one downlink (DL) traffic condition or at least one uplink (UL) traffic condition, at least one transmit (Tx) chain for a transmission of a codebook-based sounding reference signal (SRS-CB), wherein the at least one UL traffic condition includes one or more of an amount of the UL traffic being less than a UL traffic threshold or a latency sensitivity of the UL traffic being less than a latency threshold; and
        transmit, based on disabling the at least one Tx chain, the SRS-CB via an antenna associated with at least one active Tx chain.

11. A method of wireless communication performed by a user equipment (UE), the method comprising:
    disabling, based on a sounding reference signal for antenna switching (SRS-AS) resource being overloaded with a codebook-based SRS (SRS-CB) resource, at least one transmit (Tx) chain for a transmission of an SRS-CB;
    disabling SRS-AS transmission for at least one receive (Rx) chain; and
    re-mapping at least one active Rx chain paired with the disabled at least one Tx chain to at least one antenna not associated with the disabled at least one Tx chain.

12. The method of claim 11, wherein each of the at least one active Rx chain is paired with one active Tx chain, and the pair of the active Rx chain and the active Tx chain is mapped to a same antenna.

13. The method of claim 11, wherein the at least one active Rx chain is re-mapped to one or more antennas unassociated with an active Tx chain or the disabled at least one Tx chain.

14. The method of claim 13, wherein the one or more antennas correspond to a metric greater than an antenna threshold value.

15. The method of claim 14, wherein the at least one Tx chain is associated with one or more other antennas corresponding to the metric less than the antenna threshold value.

16. The method of claim 13, wherein the one or more antennas correspond to a metric greater than other antennas.

17. A user equipment (UE) for wireless communication, comprising:
memory; and
at least one processor coupled to the memory, wherein the UE is configured to:
disable at least one transmit (Tx) chain for a transmission of a codebook-based sounding reference signal (SRS-CB);
transmit, based on disabling the at least one Tx chain, the SRS-CB via an antenna associated with at least one active Tx chain; and
re-map at least one active receive (Rx) chain paired with the disabled at least one Tx chain to at least one antenna not associated with the disabled at least one Tx chain.

18. A user equipment (UE) for wireless communication, comprising:
memory; and
at least one processor coupled to the memory, wherein the UE is configured to:
disable, based on at least one condition, at least one transmit (Tx) chain for a transmission of a codebook-based sounding reference signal (SRS-CB); and
transmit, based on disabling the at least one Tx chain, the SRS-CB via an antenna associated with at least one active Tx chain, wherein the at least one condition includes an SRS antenna switching (SRS-AS) resource allocated for the SRS-AS not being overloaded with an SRS-CB resource.

19. A user equipment (UE) for wireless communication, comprising:
memory; and
at least one processor coupled to the memory, wherein the UE is configured to:
disable, based on at least one condition, at least one transmit (Tx) chain for a transmission of a codebook-based sounding reference signal (SRS-CB); and
transmit, based on disabling the at least one Tx chain, the SRS-CB via an antenna associated with at least one active Tx chain, wherein the at least one condition includes a bandwidth part (BWP) allocated for downlink (DL) being less than a threshold value.

20. A user equipment (UE) for wireless communication, comprising:
memory; and
at least one processor coupled to the memory, wherein the UE is configured to:
disable, based on at least one condition, at least one transmit (Tx) chain for a transmission of a codebook-based sounding reference signal (SRS-CB); and
transmit, based on disabling the at least one Tx chain, the SRS-CB via an antenna associated with at least one active Tx chain, wherein the at least one condition includes a number of receive (Rx) chains corresponding to an adaptive Rx diversity (ARD) configuration being less than a threshold value.

21. A user equipment (UE) for wireless communication, comprising:
memory; and
at least one processor coupled to the memory, wherein the UE is configured to:
disable, based on at least one condition, at least one transmit (Tx) chain for a transmission of a codebook-based sounding reference signal (SRS-CB); and
transmit, based on disabling the at least one Tx chain, the SRS-CB via an antenna associated with at least one active Tx chain, wherein the at least one condition includes a number of receive (Rx) chains corresponding to an adaptive Rx diversity (ARD) configuration being greater than or equal to a threshold value and an amount of DL traffic being less than a DL traffic threshold.

22. The UE of claim 21, wherein the amount of the DL traffic is based on at least one of a density of DL grants, a configuration of supportable DL throughput, or an application information of the DL.

* * * * *